United States Patent [19]

Meier et al.

[11] 3,976,452

[45] Aug. 24, 1976

[54] DEVICE FOR THE SEPARATION OF GAS FROM A LIQUID

[75] Inventors: Hans Meier, Remscheid; Andreas Wille, Wuppertal, both of Germany

[73] Assignee: Joh. Vaillant, K.G., Remscheid, Germany

[22] Filed: Aug. 12, 1974

[21] Appl. No.: 496,805

[30] Foreign Application Priority Data

Sept. 14, 1973 Germany............................ 2346286

[52] U.S. Cl.................................... 55/192; 55/199
[51] Int. Cl.².......................................... B01D 19/00
[58] Field of Search.................. 55/36, 39, 52, 159, 55/185, 192, 199, 203

[56] References Cited
UNITED STATES PATENTS 3,290,864    12/1966    Harker et al........................ 55/203

*Primary Examiner*—Charles N. Hart
*Assistant Examiner*—Richard W. Burks
*Attorney, Agent, or Firm*—Toren, McGeady and Stanger

[57] ABSTRACT

The present invention relates to a device for the separation of gases from liquids, in particular from the water of a heating system, the separating device being united constructionally with the heating pump, the pump housing being divided into chambers by the provision of liquid guiding webs, a turbulence chamber being produced.

9 Claims, 6 Drawing Figures

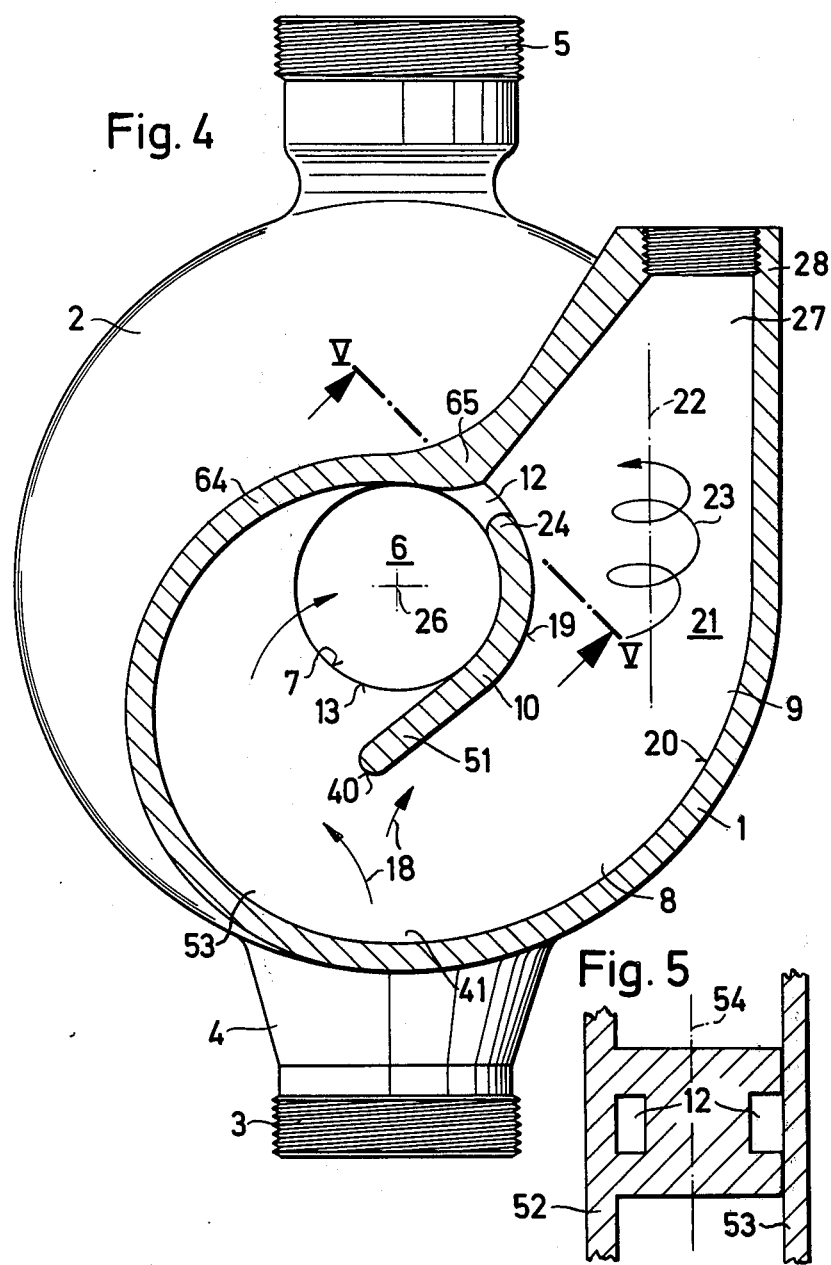

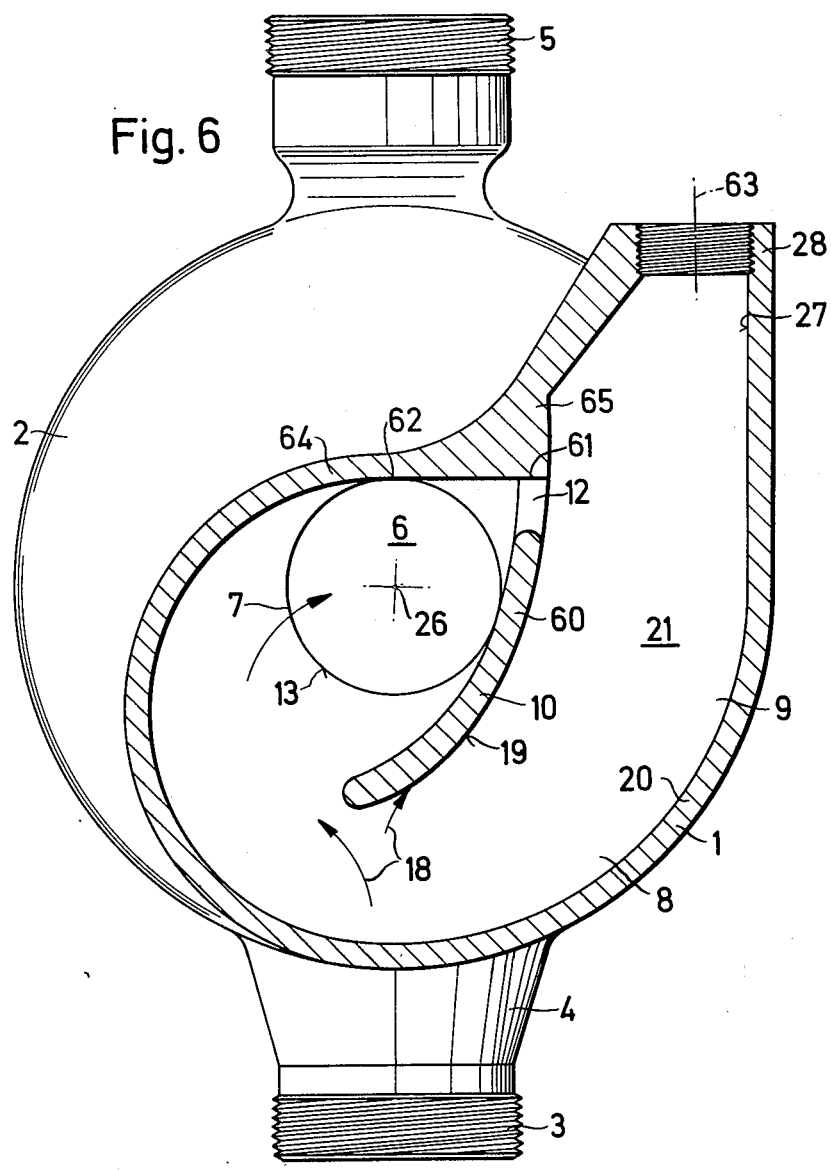

DEVICE FOR THE SEPARATION OF GAS FROM A LIQUID

BACKGROUND AND SUMMARY OF THE INVENTION

The present invention relates to a device for the separation of gas from a liquid passed through a housing via a supply pipe and a discharge pipe substantially vertical thereto, the cross-section for the supply flow water in the housing enlarging.

Such gas separating devices are particularly required in central heating systems. The air separators themselves are provided in prior cases at the highest point of the rotary pump of a central heating. To improve the separating effect, such air separators are preceded by a filter.

These prior designs for the separation of air, however, suffer from considerable shortcomings; at the cross-sectional reductions caused by the filters restricted areas are produced which clog due to impurities. This impedes the circulation of the heating. Moreover, the filters present an additional display of apparatus.

It is an object of the present invention to provide a simple and operationally safe gas separating device which can be connected directly in front of a pump without requiring further changes. In particular, it shall also be attained that the pump being filled with air when the heating system is started, is readily vented in order that it may feed water at least partially when starting.

In a gas separating device of the type mentioned hereinbefore, according to the present invention these objects are solved in that there is provided a flow divider in front of the point of deflection in the housing dividing the flow in a direction towards the discharge pipe and in a direction towards a stabilizing chamber in an unequal ratio in favor of the exit opening, that the stabilizing chamber has a connecting opening towards the discharge pipe, disposed a spaced distance from its central plane intersecting the discharge pipe, which is arranged above the center line of the discharge pipe, and that an exhauster is provided at the upper end of the stabilizing chamber substantially in a direction of the axis of the rotation arising in the chamber.

By this design according to the present invention a simple gas separating device having no interfering cross-sectional restrictions is obtained which is also substantially free of interfering cross-sectional deflections susceptible to noise.

The individual components of the gas separating device are also readily suited for large-scale series production.

Further designs of the invention as well as advantageous modifications will become apparent from the sub-claims, the subsequent specification as well as the FIGS. 1 to 6 of the accompanying drawings.

DESCRIPTION OF THE DRAWINGS

FIG. 4 is a still further embodiment of the gas separating device in cross-section;

FIG. 5 illustrates a detail according to the section 5.5 in FIG. 4;

FIG. 6 is another embodiment of the gas separating device in cross-section.

DESCRIPTION OF SPECIFIC EMBODIMENT

Figure 1:
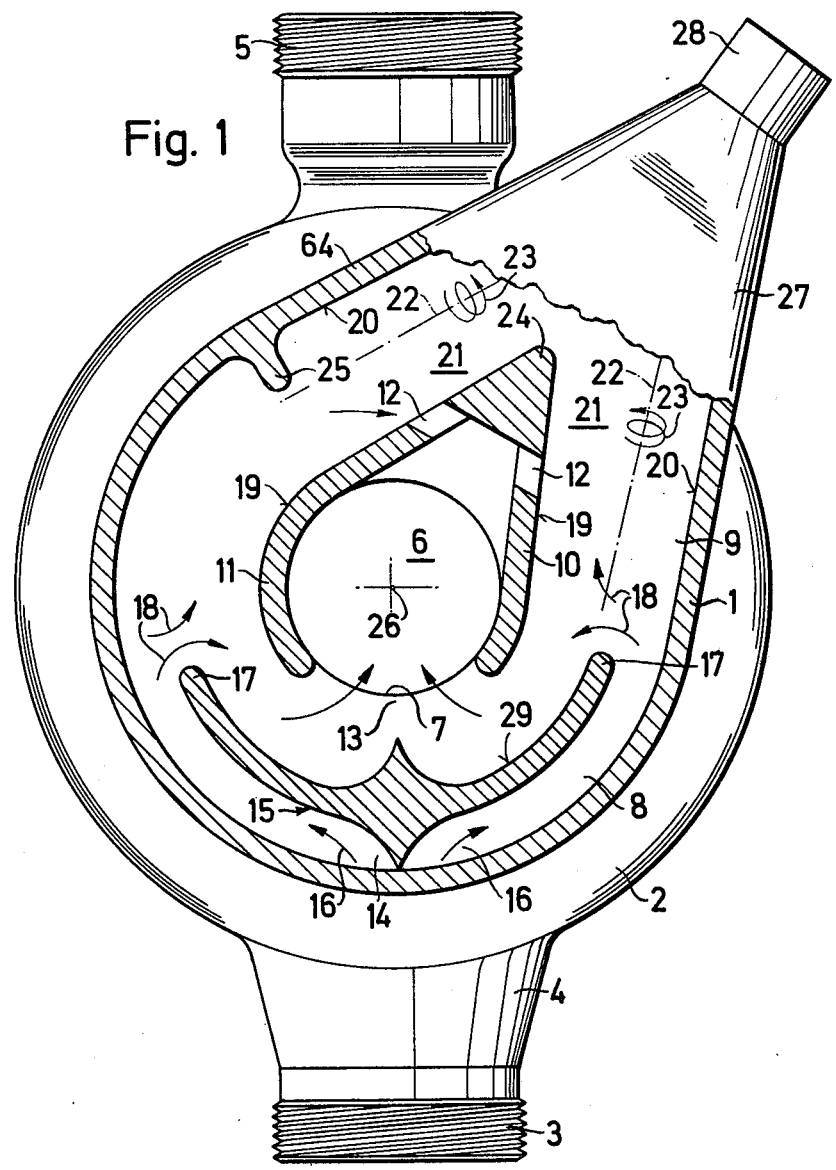
FIG. 1 illustrates a gas separating device in the outer chamber of a pump in cross-section.

In all six Figures the same reference numerals designate the same details.

The gas separating device according to FIG. 1 comprises a housing 1 which is provided on the input side of a pump 2. The pump is associated with a central heating circuit whose other components are not illustrated. Water is supplied vertically to the housing 1 via a supply pipe 3 whose last portion enlarges as at 4. An outlet opening 5 is provided at the upper end of the housing 1 of the pump 2. Whereas the supply pipe 3 is vertical, the exit opening 6 is arranged horizontally wherefrom a point of deflection 7 results in another plane in the housing 1.

In the interior 9 of the gas separator made of cast iron there are provided two flow dividers 10 and 11 which surround the exit opening 6. The flow dividers 10 and 11 confine two relatively narrow openings 12 at the upper end, however, a relatively wide opening 13 at the lower end between them.

In the event that the pump 2 is not directly connected to the housing 1, the exit opening 6 may also represent a discharge pipe. In the case of the more remote pump it should be noted that the pump is not arranged at a higher leven than the exit opening 6. Between the opening 13 and an inlet opening 14 there is provided a deflector 15 which divides the water flow from the supply pipe 3 into equal parts according to the arrows 16. At the ends 17 of the deflector 15 the water flow is deflected according to the arrows 18. Between an outer side 19 of the flow divider 10 and an inner side 20 of the housing 1, respectively between the outer side 19 of the flow divider 11 and the inner side 20 of the housing 1 stabilizing chambers 21 are formed in which a rotation 23 about an axis 22 is produced. A projection 24 associated with the housing 1 serves to limit the eddy generated by suction, rotating radially about the discharge pipe. Another projection 25 presented vertically to the center line 26 of the exit opening also has the same function.

At the upper end 27 there is provided a threaded socket 28 for an exhauster (not illustrated).

As can be gathered from the cross-sectional relations, the free passage cross-section between the outer sides 19 of the flow dividers 10 and 11 and the inner sides 20 of the housing 1 is greater than the free cross-section between the inner side 29 of the deflector 15 and the outer side 19. Therewith, the water flow is divided into unequal flow parts so that the stabilizing chambers have associated therewith the smaller proportion of the incoming water flow, however, the greater gas proportion.

Since the flow dividers 10 and 11 are provided with openings 12 which may be arranged alternatively according to FIG. 5, the water flow in the stabilizing chambers is cut at one side so that the already mentioned rotations of the water arise in the stabilizing chambers. As a consequence of this rotation, the specifically lighter gas, respectively the specifically lighter air is forced towards the center of the stabilizing chambers and can flow off along the axis of rotation in a direction towards the mounted exhauster. With upstanding pump the air present in the pump, respectively in the exit opening 6 can evade unimpededly through the upper openings 12 from both portions. As can also be seen, the openings 12 are arranged above the central line 26 of the exit opening 6, whereby venting of the exit opening 6 is attained.

Figure 2:
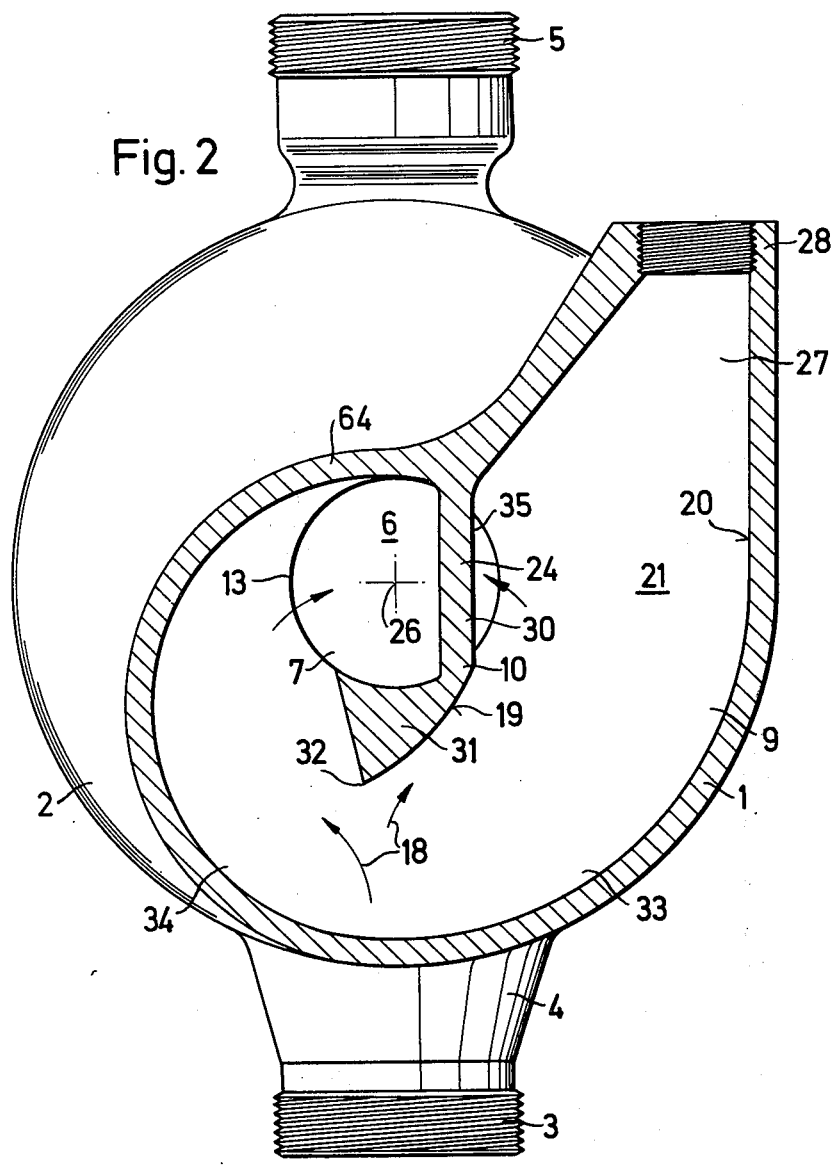
FIG. 2 is a variant of the embodied form of the gas separating device also in cross-section.

In the embodiment according to FIG. 2, only one flow divider 10 is provided which chordally extends over the exit openings 6 and 26 with its portion 30. A lower portion 31 is provided with a point 32 dividing the incoming water into two differently great flows, the greater water flow 34 being associated with the exit opening 6 and the smaller water flow 33 being associated with the stabilizing chamber 21. Also in this embodiment a rotation is generated in the stabilizing chamber 21, effective to cause the gas bubbles to unite to greater ones at the axis of rotation, which can travel up unimpededly to the upper threaded socket 28. Here too, it is assured that by a partial opening 35 of the exit opening 6 the discharge pipe, respectively a pump possibly connected therebehind can be vented.

Figure 3:
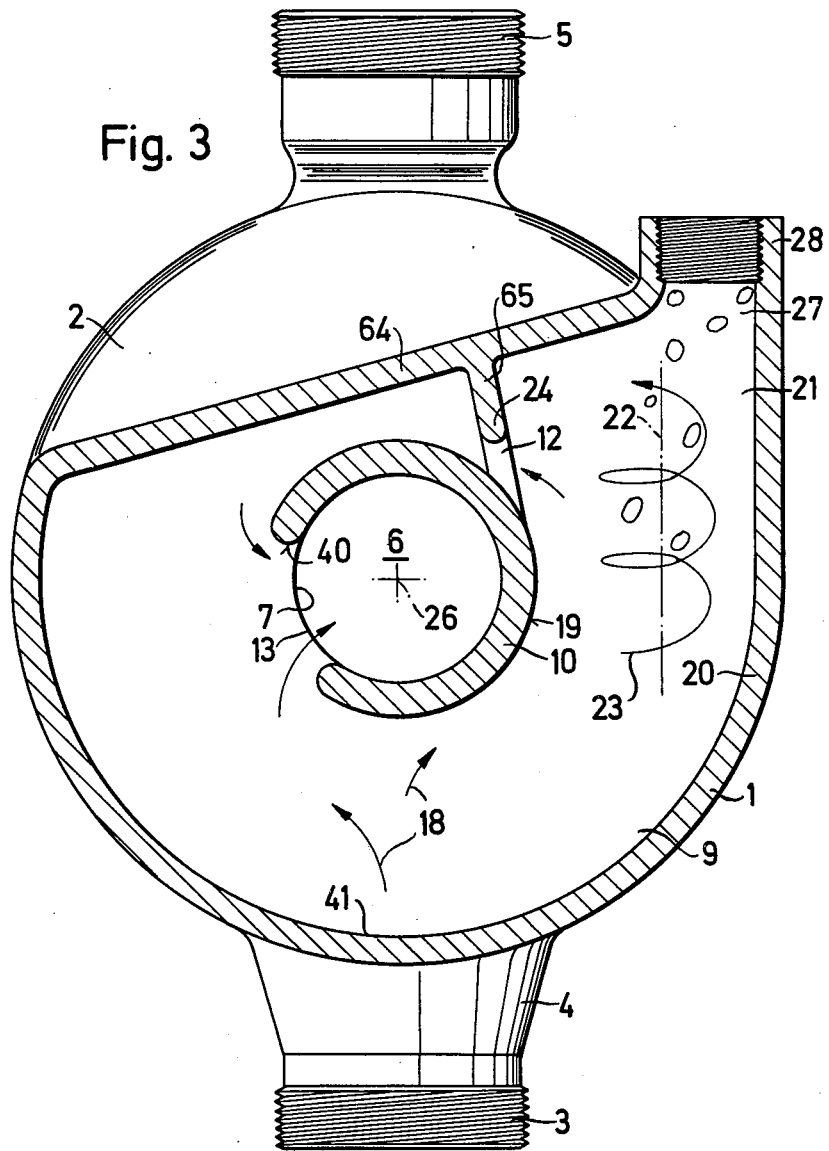
FIG. 3 is a further variant.

In the embodiment according to FIG. 3, the flow divider 10 is designed as a cylinder enclosing the exit pipe 6 at a sector angle of about 270°, which is connected with the housing 1 via the projection 24 having the opening 12. Via the deflection point 7 the supply pipe 3 is in communication with the exit opening 6. With upstanding pump air can evade from the exit opening 6 below an edge 40 of the flow divider 10 through the opening 12 into the upper portion of the stabilizing chamber 21. Here too, a flow division according to the arrows 18 takes place in the area of an inlet opening 41, the smaller flow proportion flowing off in a direction towards the stabilizing chamber and effecting the already mentioned rotational movement 23 therein. It should be mentioned that in the area of the stabilizing chamber 21 a considerable deceleration of the water flow occurs due the ever increasing cross-section so that gas bubbles can separate there particularly easily. On the other hand there are no cross-sectional restriction or interfering areas which may clog or give rise to flow noise.

In the embodiment according to FIG. 4, the flow divider 10 after enclosure of a sector angle of about 90° extends tangentially as wall of the exit opening 6 in an area 51 in a direction towards the inlet opening 41 above the supply pipe 3. The edge 40 of the flow divider 10 provides for the already mentioned flow division according to the arrows 18. Here too, the water inflow into the stabilizing chamber 21 is substantially smaller than the water flow proportion in a direction towards the deflection point 7.

According to FIG. 5, the opening 12 — in addition to FIG. 1 also compare FIGS. 3, 4 and 6 — can be arranged in the vicinity of the bottom 52 or of the cover 53 of the gas separating device. However, only one respective opening is provided which is arranged either above or below a central plane 54. All illustrations according to FIGS. 1 to 4 and FIG. 6 are to be understood with housing cover 53 removed.

In the embodied variant according to FIG. 6 the flow divider 10 is designed so that it only contacts the exit opening 6 as tangent at a point 60. The interior of the exit opening 6 can again be vented in the known manner through the opening 12. A bottom edge 61 of the opening 12 is disposed at least at the same level as the upper edge 62 of the exit opening 6. Whereas the greater water stream flows to the exit opening 6 with relatively small gas content, the smaller water flow travels to the stabilizing chamber 21 wherein it sets the greater water proportion free.

We claim:

1. Apparatus for separating gas from a liquid pumped therethrough, said apparatus comprising a housing having inner wall means defining a separation chamber, a liquid supply pipe leading into said separation chamber in a given direction with an enlarging cross section extending in the direction of flow therethrough, a discharge pipe extending from an exit opening in said separation chamber in a direction substantially perpendicular to said supply pipe, flow deflection wall means arranged to define, together with the inner wall means of said housing, stabilizing chamber means within said separation chamber, said stabilizing chamber means being configured to effect therein vortical flow of fluid about a vortex axis, said flow deflection wall means extending between said stabilizing chamber means and said exit opening and being arranged to divide flow entering said separation chamber from said supply pipe into a pair of flow paths, one extending to said exit opening and the other extending into said stabilizing chamber with the major portion of said flow being directed toward said exit opening, exhauster means provided above said stabilizing chamber means defining an exhaust flow path therefrom extending in a direction generally coincident with the direction of said vortex axis, and orifice means extending through said flow deflection wall means in flow communication between said exit opening and said stabilizing chamber means, said orifice means being arranged to extend in a direction generally eccentrically to the path of said vortex flow about said vortex axis in said stabilizing chamber means and located longitudinally relative to said vortex axis to impart to said vortex flow a longitudinal component progressing toward said exhauster means.

2. Apparatus according to claim 1 wherein said flow deflection wall means are configured to define an integral wedge-shaped point extending into said separation chamber.

3. Apparatus according to claim 1 wherein said flow deflection wall means are arranged to enclose said exit opening, with spaced apart openings being provided through said flow deflection wall means.

4. Apparatus according to claim 1 including deflector means located between said liquid supply pipe and said flow deflector wall means in the path of liquid flow entering said separation chamber through said enlarging cross section of said liquid supply pipe, said liquid supply pipe being configured to have a central longitudinal plane extending therethrough, said deflector means being configured to be symmetrical about said central longitudinal plane.

5. Apparatus according to claim 1 further including projections formed on said inner wall means of said housing to extend therefrom into said separation chamber, said projection webs being disposed to extend radially relative to said exit opening.

6. Apparatus according to claim 1 wherein said flow deflection wall means are connected to said inner wall means of said housing at an upper part of said housing by means of a connecting web having an opening therethrough.

7. Apparatus according to claim 1 wherein said orifice means includes an upper edge and wherein said exit opening includes an upper edge, said upper edge of said orifice means being aligned with said upper edge of said exit opening.

8. Apparatus according to claim 1 wherein said flow deflection wall means are arranged to extend tangentially from said exit opening and partially across said enlarging cross section of said supply pipe.

9. Apparatus according to claim 1, wherein said exhauster means comprise a threaded socket defining an axis for said exhauster means, and wherein said vortex axis is arranged generally parallel to the axis of said threaded socket of said exhauster means.

* * * * *